(12) United States Patent
Bish et al.

(10) Patent No.: US 9,336,149 B2
(45) Date of Patent: May 10, 2016

(54) PARTIAL VOLUME ACCESS IN A PHYSICAL STACKED VOLUME

(75) Inventors: Thomas W. Bish, Tucson, AZ (US); Erika M. Dawson, Tucson, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/775,425

(22) Filed: May 6, 2010

(65) Prior Publication Data

US 2011/0276754 A1 Nov. 10, 2011

(51) Int. Cl.
*G06F 7/00* (2006.01)
*G06F 17/30* (2006.01)
*G06F 12/08* (2016.01)
*G06F 3/06* (2006.01)
*G06F 11/14* (2006.01)

(52) U.S. Cl.
CPC .......... *G06F 12/0866* (2013.01); *G06F 3/0611* (2013.01); *G06F 3/0659* (2013.01); *G06F 3/0686* (2013.01); *G06F 11/1456* (2013.01); *G06F 2212/213* (2013.01); *G06F 2212/224* (2013.01)

(58) Field of Classification Search
CPC ..................... G06F 17/30067; G06F 17/30091
USPC .......................................... 711/111; 707/823
See application file for complete search history.

(56) References Cited

U.S. PATENT DOCUMENTS

| | | | |
|---|---|---|---|
| 5,546,557 A * | 8/1996 | Allen et al. | 711/111 |
| 5,608,875 A * | 3/1997 | Mori | 711/4 |
| 5,926,836 A | 7/1999 | Blumenau | |
| 6,173,359 B1 * | 1/2001 | Carlson et al. | 711/111 |
| 6,467,021 B1 | 10/2002 | Sinclair | |
| 6,490,648 B1 | 12/2002 | Kaneda et al. | |
| 6,625,704 B2 * | 9/2003 | Winokur | 711/162 |
| 6,708,265 B1 * | 3/2004 | Black | 711/207 |
| 6,816,941 B1 * | 11/2004 | Carlson et al. | 711/111 |
| 6,912,548 B1 * | 6/2005 | Black | 709/229 |
| 7,107,417 B2 * | 9/2006 | Gibble et al. | 711/161 |
| 7,428,604 B2 * | 9/2008 | Black | 710/31 |

(Continued)

OTHER PUBLICATIONS

Sang Su Nam et al., "A hybrid mapping technique for logical volume manager in SAN environments" Korea Inf. Sci. Soc, Journal of KISS: Computing Practices, vol. 10, No. 1, p. 99-113, Feb. 2004.

(Continued)

*Primary Examiner* — Mark E Hershley
(74) *Attorney, Agent, or Firm* — Zilka-Kotab, PC

(57) ABSTRACT

In one embodiment, a VTS system includes a tape volume cache, a storage drive for interacting with sequential access storage media; logic for receiving a mount request to access host data record(s) stored on a storage medium, the mount request including a virtual volume identifier of a logical volume and a logical block identifier of the first requested host data record therein; logic for issuing a locate command to position the sequential access storage medium to about a physical block in the logical volume having at least a portion of the requested host data record(s) therein based on the virtual volume identifier and the logical block identifier; logic for creating and supporting a partial virtual volume in the tape volume cache; and logic for copying at least the physical block to the partial virtual volume. Other systems, methods, and computer program products are also described, according to other embodiments.

24 Claims, 8 Drawing Sheets

(56) References Cited

U.S. PATENT DOCUMENTS

| | | | |
|---|---|---|---|
| 7,437,492 B2* | 10/2008 | Stager et al. | 710/68 |
| 7,603,530 B1 | 10/2009 | Liikanen et al. | 711/162 |
| 8,533,427 B2 | 9/2013 | Bish et al. | |
| 8,656,094 B2 | 2/2014 | Peake | |
| 8,856,436 B2 | 10/2014 | Peake | |
| 8,898,428 B2 | 11/2014 | Bish et al. | |
| 2002/0035664 A1* | 3/2002 | Yates et al. | 711/111 |
| 2003/0037184 A1* | 2/2003 | Day et al. | 710/1 |
| 2004/0044828 A1* | 3/2004 | Gibble et al. | 711/4 |
| 2004/0078639 A1* | 4/2004 | Anna et al. | 714/6 |
| 2007/0055831 A1* | 3/2007 | Beeston et al. | 711/154 |
| 2008/0040539 A1 | 2/2008 | Haustein et al. | |
| 2008/0172542 A1 | 7/2008 | Kaushik | 711/202 |
| 2008/0244205 A1 | 10/2008 | Amano et al. | |
| 2008/0250197 A1* | 10/2008 | Daily et al. | 711/111 |
| 2009/0049311 A1 | 2/2009 | Carlson et al. | |
| 2009/0083501 A1* | 3/2009 | Friauf et al. | 711/158 |
| 2009/0204759 A1* | 8/2009 | Seaman et al. | 711/114 |
| 2009/0237828 A1 | 9/2009 | Hatabe | |
| 2009/0248974 A1 | 10/2009 | Bello et al. | 711/111 |
| 2010/0057844 A1* | 3/2010 | Johnson | 709/203 |
| 2010/0103549 A1 | 4/2010 | Murayama et al. | |
| 2010/0306500 A1* | 12/2010 | Mimatsu | 711/209 |
| 2011/0276753 A1 | 11/2011 | Peake | |
| 2011/0276756 A1 | 11/2011 | Bish et al. | |
| 2012/0239876 A1* | 9/2012 | Bish et al. | 711/111 |
| 2012/0239877 A1* | 9/2012 | Peake | 711/111 |
| 2013/0290625 A1 | 10/2013 | Bish et al. | |
| 2016/0011794 A1 | 1/2016 | Bish et al. | |

OTHER PUBLICATIONS

Sukwoo Kang et al., "An Approach to Virtual Allocation in Storage Systems" ACM Transactions on Storage, vol. 2, No. 4, Nov. 2006, pp. 371-399.
Non-Final Office Action Summary from U.S. Appl. No. 12/775,421 dated Jun. 8, 2012.
Non-Final Office Action Summary from U.S. Appl. No. 13/484,142 dated Jun. 21, 2012.
U.S. Appl. No. 12/775,421 filed May 6, 2010.
U.S. Appl. No. 12/775,413 filed May 6, 2010.
Restriction/Election Requirement from U.S. Appl. No. 12/775,413 dated Dec. 7, 2012.
Non-Final Office Action from U.S. Appl. No. 12/775,413 dated Jan. 2, 2013.
Non-Final Office Action from U.S. Appl. No. 13/484,133 dated Dec. 11, 2012.
Final Office Action from U.S. Appl. No. 12/775,421 dated Jan. 9, 2013.
Final Office Action from U.S. Appl. No. 13/484,142 dated Jan. 4, 2013.
Notice of Allowance and Fee(s) Due from U.S. Appl. No. 12/775,413 dated Apr. 24, 2013.
Final Office Action from U.S. Appl. No. 13/484,133 dated Jun. 17, 2013.
Notice of Allowance and Fee(s) Due from U.S. Appl. No. 12/775,421 dated Oct. 2, 2013.
Zhang et al., "HPTFS: A High Performance Tape File System," Proceedings of 14th NASA Goddard/23rd IEEE Conference on Mass Storage System and Technologies, 2006, pp. 1-11.
Feng et al., "TLFS: High Performance Tape Library File System for Data Backup and Archive," Proceedings of 7th International Meeting on High Performance Computing for Computational Science, Rio de Janeiro, Brazil, Springer 2006, pp. 1-14.
Bradshaw et al., "Fifty Years of IBM Innovation with Information Storage on Magnetic Tape," IBM Journal of Research and Development 47.4, 2003, pp. 373-383.
Hughes et al., "High Performance RAIT," NASA Conference Publication, NASA, 1998, 2002, pp. 65-74.
Non-Final Office Action from U.S. Appl. No. 13/484,142 dated Oct. 1, 2013.
Final Office Action from U.S. Appl. No. 13/484,142 dated Jan. 6, 2014.
Notice of Allowance and Fee(s) Due from U.S. Appl. No. 13/484,142 dated Apr. 29, 2014.
"SAE—Stand Alone Restore," NewEra Software, Inc., Software for Image Management & System Recovery, Apr. 24, 2001.
International Search Report and Written Opinion from International Application No. PCT/EP11/56699, dated Jul. 19, 2011.
Notice of Allowance from U.S. Appl. No. 13/484,133, dated Jul. 16, 2014.
Corrected Notice of Allowance from U.S. Appl. No. 13/484,133, dated Sep. 5, 2014.
Corrected Notice of Allowability from U.S. Appl. No. 13/484,142, dated Sep. 12, 2014.
Bish et al., U.S. Appl. No. 12/775,425, filed May 6, 2010.
Peake, J. W., U.S. Appl. No. 13/484,142, filed May 30, 2012.
Bish et al., U.S. Appl. No. 13/927,312, filed Jun. 26, 2013.
Bish et al., U.S. Appl. No. 13/484,133, filed May 30, 2012.
Non-Final Office Action from U.S. Appl. No. 13/927,312, dated Sep. 1, 2015.
Bish et al., U.S. Appl. No. 14/858,736, filed Sep. 18, 2015.
Non-Final Office Action from U.S Appl. No. 14/858,736, dated Nov. 10, 2015.
Final Office Action from U.S. Appl. No. 13/927,312, dated Mar. 10, 2016.
Final Office Action from U.S. Appl. No. 14/858,736, dated Mar. 28, 2016.

\* cited by examiner

Virtual Tape Volume 200

| Volume Header 210 | Host Data Record 1 | 220 | Host Data Record 2 | 220 | ... | Host Data Record J | 220 |
|---|---|---|---|---|---|---|---|

FIG. 2

Volume Header 210

| Volume ID 212 | Volume Length 214 | Volume Control Flags |
|---|---|---|
| | | Partial Volume 218 |

Host Data Record 220

| Block ID 222 | Record Length 224 | Compressed Host Data 226 |
|---|---|---|

FIG. 4

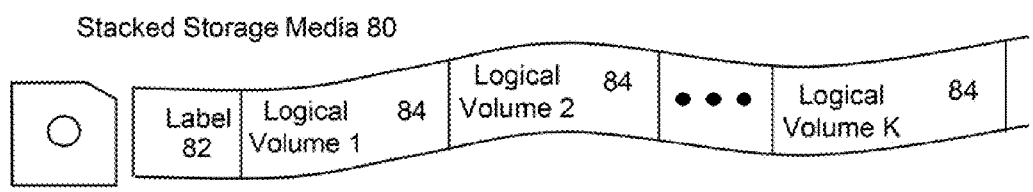
FIG. 5
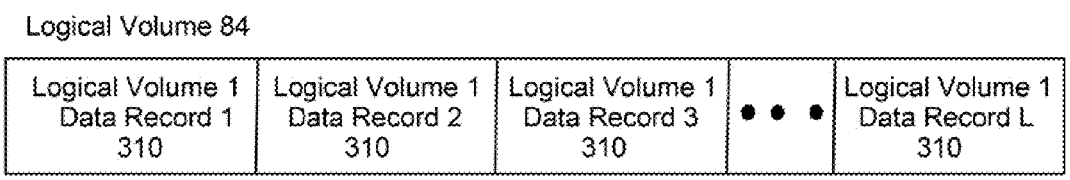
FIG. 6
Logical Volume Data Record 310
| Virtual Volume VOLSER 312 | Virtual Volume Start Block ID 314 | Virtual Volume Data 316 |
FIG. 7

Host Mount Request 400

| VOLSER 410 | New Flag 420 | Start Block ID 430 | Block Count 440 | Block Size 450 |
|---|---|---|---|---|

VOLSER Database Table 68

| VOLSER 510 | Cache Resident Type 520 | Physical Tape VOLSER 530 | Starting Block 540 | Blocks 550 | Last Access Date/Time 560 | Compression Ratio 570 |
|---|---|---|---|---|---|---|
| ABC123 | Resident | Null | Null | Null | 3/3/10 8:24:35 | 2.03 |
| EFG555 | Copied | 123456 | 39005 | 35125 | 3/1/10 17:38:12 | 3.14 |
| JKL777 | No | 545454 | 84278 | 39748 | 1/25/10 14:56:01 | 4.25 |
| XYZ999 | Partial | 999999 | 63018 | 39898 | 2/25/10 5:17:47 | 2.77 |

504
503
502
501

VOLSER Database Table 68

| VOLSER 510 | ... | Host Dataset Name 580 |
|---|---|---|
| ABC123 | ... | HSMMIGRATE |
| EFG555 | ... | HSMMIGRATE |
| JKL777 | ... | HSMBACKUP |
| XYZ999 | ... | APP03052010 |

PARTIAL VOLUME ACCESS IN A PHYSICAL STACKED VOLUME

BACKGROUND

There are a plurality of applications on large operating systems, such as mainframe and server operating systems, that place multiple datasets or objects on a tape volume. Examples include, but are not limited to, Data Facility Storage Management System (DBMS) Hierarchical Storage Manager (HSM), DFSMS Object Access Method (OAM) and Tivoli Storage Manager (TSM). HSM and TSM may be used to migrate Direct Access Storage Device (DASD) datasets from one storage device to another, such as from a hard disk drive (HDD) to a tape drive, or to make a copy of a dataset, possibly to create a backup dataset. OAM places object data on a tape volume that may be a backup of data or original data. Typically, these applications access a database in which they keep track of the dataset/object name, the tape volume it was written to, the location on the tape volume of the dataset and/or object, and how many tape records make up the dataset/object.

When one of the migrated or backup datasets is requested by a user, these applications request a mount of the tape volume, and once the mount has completed, the applications instruct the tape drive to position to the location where the records associated with the dataset/object reside, and then read the requested records. This is typically referred to as a recall operation. If there are no other datasets on the tape volume to be recalled, the volume is demounted. The size of the dataset/object being recalled is often less than 250 KB in DFSMS HSM datasets, but may be any size in any system. There are also applications on open system platforms, such as TSM, that work in this way.

In physical tape drives, one of the key functions that is typical of an enterprise class tape drive is the ability to do a high speed locate operation to the beginning of the data to be read. This allows the tape drive to position to the requested data much faster than by just using conventional forward space block and read commands.

For a virtual tape storage (VTS) system that internally employs hierarchical storage (such as direct access storage device (DASD) cache and sequential access media), there are several reasons that a significant amount of inefficiency occurs when handling the above described types of application workloads. One of the biggest problems encountered when putting applications with this type of data on a VTS system is the time that occurs while waiting for a recall operation to retrieve the requested data. This is because the majority of the data written to a VTS system resides on sequential access media, such as tape cartridges, not in the DASD cache, which might be one or more a hard disk drives (HDDs). When data is requested that is only on sequential access media, it is recalled (copied) back into the DASD cache such that it is accessible to a host system. Currently, if the recall times are not acceptable to the user of the VTS system, native tape drives are added to the overall solution to replace non-native ones, and this can significantly increase the cost of the system to the customer. Therefore, it would be beneficial to have a system and/or method which could reduce the inefficiencies in accessing data on VTS systems which employ hierarchical storage.

SUMMARY

In one embodiment, a virtual tape storage (VTS) system includes a tape volume cache, at least one storage drive for interacting with sequential access storage media, logic for receiving a mount request to access at least one host data record stored on a sequential access storage medium, the mount request including a virtual volume identifier of a logical volume stored on the sequential access storage medium having the requested at least one host data record therein, logic for issuing a locate command to position the sequential access storage medium to about a physical block in the logical volume having at least a portion of the requested at least one host data record therein based on the virtual volume identifier, logic for creating and supporting a partial virtual volume in the tape volume cache, and logic for copying at least the physical block having at least a portion of the requested at least one host data record residing therein to the partial virtual volume.

According to another embodiment, a method for accessing data stored in a virtual tape storage (VTS) system includes receiving a mount request to access at least one host data record in a VTS system, wherein the mount request includes: a virtual volume identifier of a virtual volume having the requested at least one host data record therein, a logical block location of a beginning of the requested at least one host data record in the virtual volume, a number of host data records that comprise the requested at least one host data record, and an uncompressed size of the requested at least one host data record. The method also includes determining a position where a physical block having at least a portion of the requested at least one host data record therein begins, issuing a locate command to position a sequential access storage medium having the logical volume stored therein to about a position where the physical block having at least a portion of the requested at least one host data record therein is located based on the virtual volume identifier, creating a partial virtual volume in a tape volume cache, and copying at least the physical block having the requested at least one host data record therein from the sequential access storage medium to the partial virtual volume.

In yet another embodiment, a computer program product for accessing data stored on a virtual tape storage (VTS) system includes a computer readable storage medium having computer readable program code embodied therewith. The computer readable program code comprises computer readable program code configured to receive a mount request to access at least one host data record in a VTS system. The mount request includes a virtual volume identifier of a virtual volume having the requested data therein, the virtual volume being stored on a sequential access storage medium as a logical volume, a logical block location of a beginning of the requested at least one host data record in the virtual volume, a number of host data records that comprise the requested at least one host data record, and an uncompressed size of the requested at least one host data record. The computer readable program code also includes computer readable program code configured to determine a position where a physical block having at least a portion of the requested at least one host data record therein begins, computer readable program code configured to issue a locate command to position the sequential access storage medium to about the position where the physical block having at least a portion of the requested at least one host data record therein is located based on the virtual volume identifier, computer readable program code configured to determine an amount of data to copy based on at least one of the number of host data records that comprise the requested at least one host data record, and the uncompressed size of the requested at least one host data record, computer readable program code configured to create a partial virtual volume in a tape volume cache, and computer readable program code configured to copy at least the physical block having at least a portion of the requested at least one host data record therein from the sequential access storage medium to the partial virtual volume.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 2 is a generalized diagram of a virtual volume used to store data in the virtual tape storage system of FIG. 1C, in one embodiment.

FIG. 3 is a generalized diagram of a volume header that is part of a virtual volume of FIG. 2, in one embodiment.

FIG. 4 is a generalized diagram of a host data record that is part of a virtual volume of FIG. 2, according to one embodiment.

FIG. 5 is a generalized diagram of stacked logical volumes stored on a single physical storage media volume for use in the virtual tape storage system of FIG. 1C, according to one embodiment.

FIG. 6 is a generalized diagram of a logical volume stored on a single physical storage media volume for use in the virtual tape storage system of FIG. 1C, according to one embodiment.

FIG. 7 is a generalized diagram of the logical volume data record that is part of the logical volume of FIG. 6, according to one embodiment.

FIG. 10 is a continuation of the generalized diagram that shows the contents of the virtual volume database of the virtual tape storage system of FIG. 1C, according to one embodiment.

DETAILED DESCRIPTION

Figure 1A:
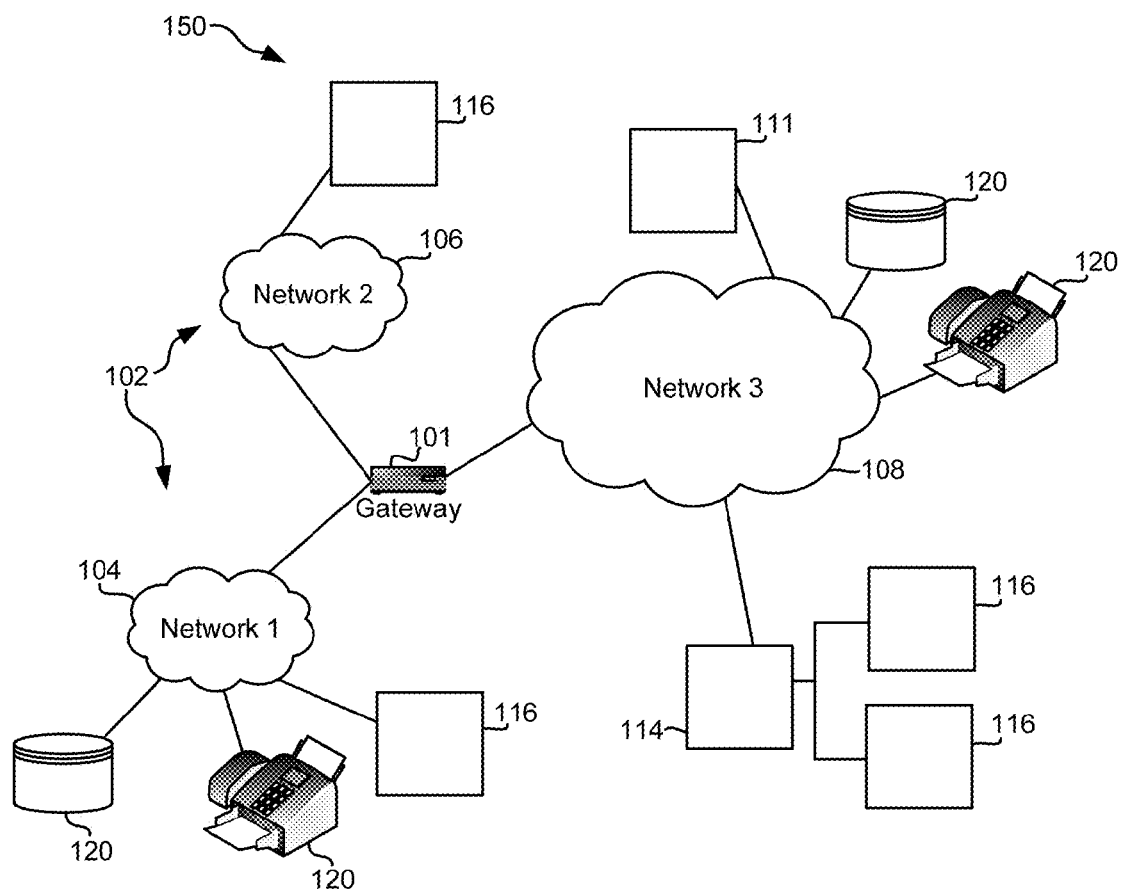
FIG. 1A illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to several preferred embodiments of the present invention, sometimes referred to as partial volume recall, an application's positional information relating to requested host data record(s) may be used by a virtual tape storage (VTS) system to correlate to a position of the actual physical location (at or before the beginning) of the requested host data record(s) on a physical stacked medium, such as a magnetic tape medium. There are three embodiments presented herein. First, the interface between the application and the VTS system may be modified so that information about the requested host data record(s) may be passed with the mount request to the VTS system. Second, a method may be implemented to allow the VTS system to use the application's positional information for the requested host data record(s) to correlate it to the actual physical location of the beginning of the requested host data record(s) on a physical stacked medium. Third, the VTS system may create a pseudo virtual volume in its tape volume cache that only contains the requested host data record(s), but still allows all required host system validation and processing of the virtual volume in order to access and copy it.

In one general embodiment, a virtual tape storage (VTS) system includes a tape volume cache, at least one storage drive for interacting with sequential access storage media, logic for receiving a mount request to access at least one host data record stored on a sequential access storage medium, the mount request including a virtual volume identifier of a logical volume stored on the sequential access storage medium having the requested at least one host data record therein, logic for issuing a locate command to position the sequential access storage medium to about a physical block in the logical volume having at least a portion of the requested at least one host data record therein based on the virtual volume identifier, logic for creating and supporting a partial virtual volume in the tape volume cache, and logic for copying at least the physical block having at least a portion of the requested at least one host data record residing therein to the partial virtual volume.

According to another general embodiment, a method for accessing data stored in a virtual tape storage (VTS) system includes receiving a mount request to access at least one host data record in a VTS system, wherein the mount request includes: a virtual volume identifier of a virtual volume having the requested at least one host data record therein, a logical block location of a beginning of the requested at least one host data record in the virtual volume, a number of host data records that comprise the requested at least one host data record, and an uncompressed size of the requested at least one host data record. The method also includes determining a position where a physical block having at least a portion of the requested at least one host data record therein begins, issuing a locate command to position a sequential access storage medium having the logical volume stored therein to about a position where the physical block having at least a portion of the requested at least one host data record therein is located based on the virtual volume identifier, creating a partial virtual volume in a tape volume cache, and copying at least the physical block having the requested at least one host data record therein from the sequential access storage medium to the partial virtual volume.

In yet another general embodiment, a computer program product for accessing data stored on a virtual tape storage (VTS) system includes a computer readable storage medium having computer readable program code embodied therewith.

The computer readable program code comprises computer readable program code configured to receive a mount request to access at least one host data record in a VTS system. The mount request includes a virtual volume identifier of a virtual volume having the requested data therein, the virtual volume being stored on a sequential access storage medium as a logical volume, a logical block location of a beginning of the requested at least one host data record in the virtual volume, a number of host data records that comprise the requested at least one host data record, and an uncompressed size of the requested at least one host data record. The computer readable program code also includes computer readable program code configured to determine a position where a physical block having at least a portion of the requested at least one host data record therein begins, computer readable program code configured to issue a locate command to position the sequential access storage medium to about the position where the physical block having at least a portion of the requested at least one host data record therein is located based on the virtual volume identifier, computer readable program code configured to determine an amount of data to copy based on at least one of the number of host data records that comprise the requested at least one host data record, and the uncompressed size of the requested at least one host data record, computer readable program code configured to create a partial virtual volume in a tape volume cache, and computer readable program code configured to copy at least the physical block having at least a portion of the requested at least one host data record therein from the sequential access storage medium to the partial virtual volume.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A illustrates a network architecture 150, in accordance with one embodiment. As shown in FIG. 1A, a plurality of remote networks 102 are provided including a first remote network 104 and a second remote network 106. A gateway 101 may be coupled between the remote networks 102 and a proximate network 108. In the context of the present network architecture 150, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 1B:
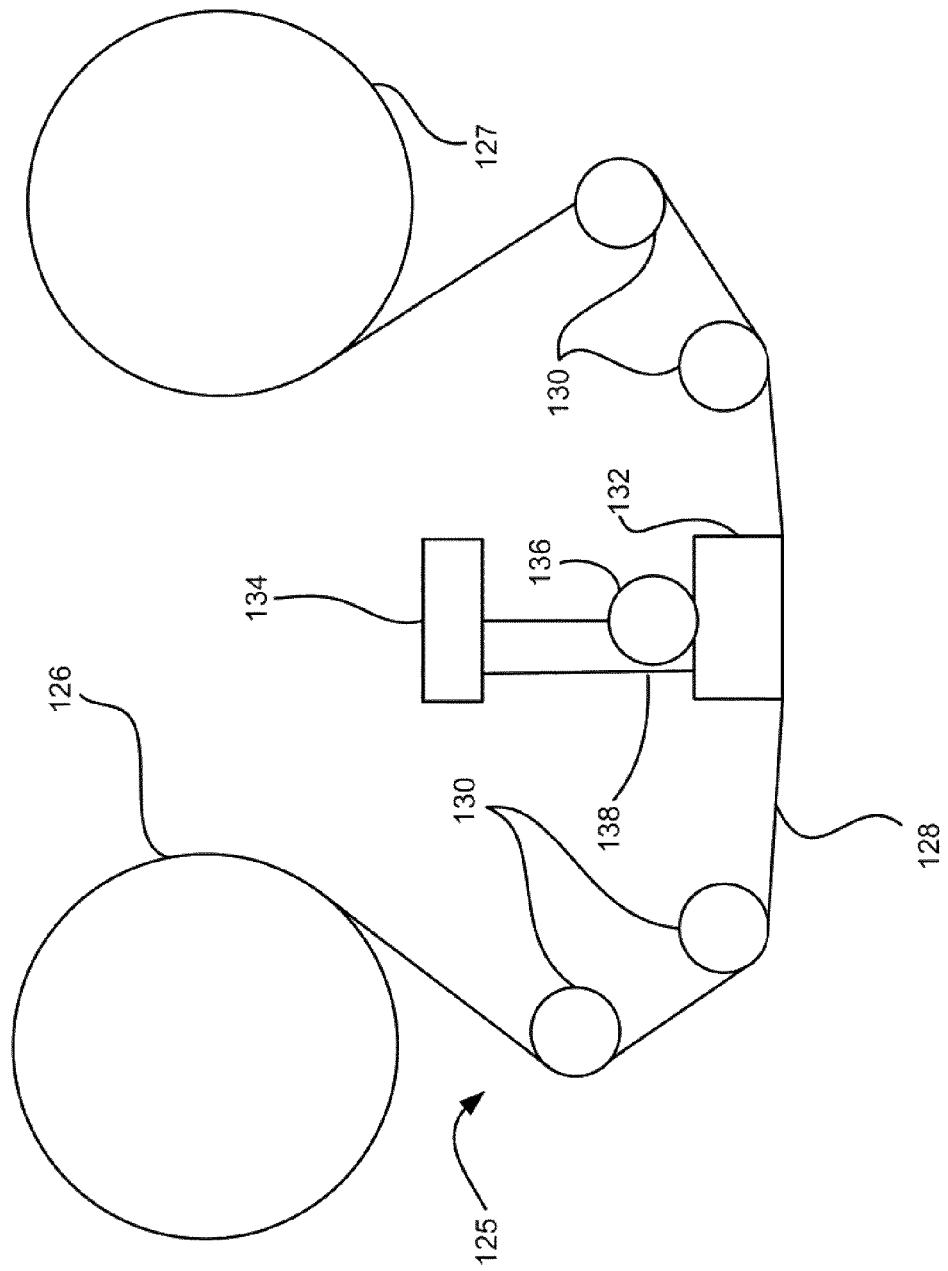
FIG. 1B is a schematic of tape drive system, in accordance with one embodiment.

FIG. 1B is a schematic diagram of a simplified tape drive system 125, in accordance with one embodiment, which may be a standalone unit, part of a tape library system, a peripheral 120 of FIG. 1A, etc. Such a tape drive may be employed in the context of an embodiment of the present invention. While one specific implementation of a tape drive 125 is shown in FIG. 1B, it should be noted that the embodiments of the previous figures may be implemented in the context of any type of tape drive system.

As shown, a tape supply cartridge 126 and a take-up reel 127 are provided to support a tape 128. These may form part of a removable cassette and are not necessarily part of the system. Guides 130 guide the tape 128 across a preferably bidirectional tape head 132. Such tape head 132 may be a MR, GMR, TMR, spin-valve, or other type. Tape head 132 is in turn coupled to a controller assembly 134 via a connector cable 138. The controller 134, in turn, controls head functions such as servo following, write bursts, read functions, etc. An actuator 136 controls position of the head 132 relative to the tape 128.

A tape drive, such as that illustrated in FIG. 1B, includes drive motor(s) to drive the tape supply cartridge 126 and the take-up reel 127 to move the tape 128 linearly over the head 132. The tape drive also includes a read/write channel to transmit data to the head 132 to be recorded on the tape 128 and to receive data read by the head 132 from the tape 128. An interface is also provided for communication between the tape drive and a host (integral or external) to send and receive the data and for controlling the operation of the tape drive and communicating the status of the tape drive to the host, all as will be understood by those of skill in the art.

Figure 1C:
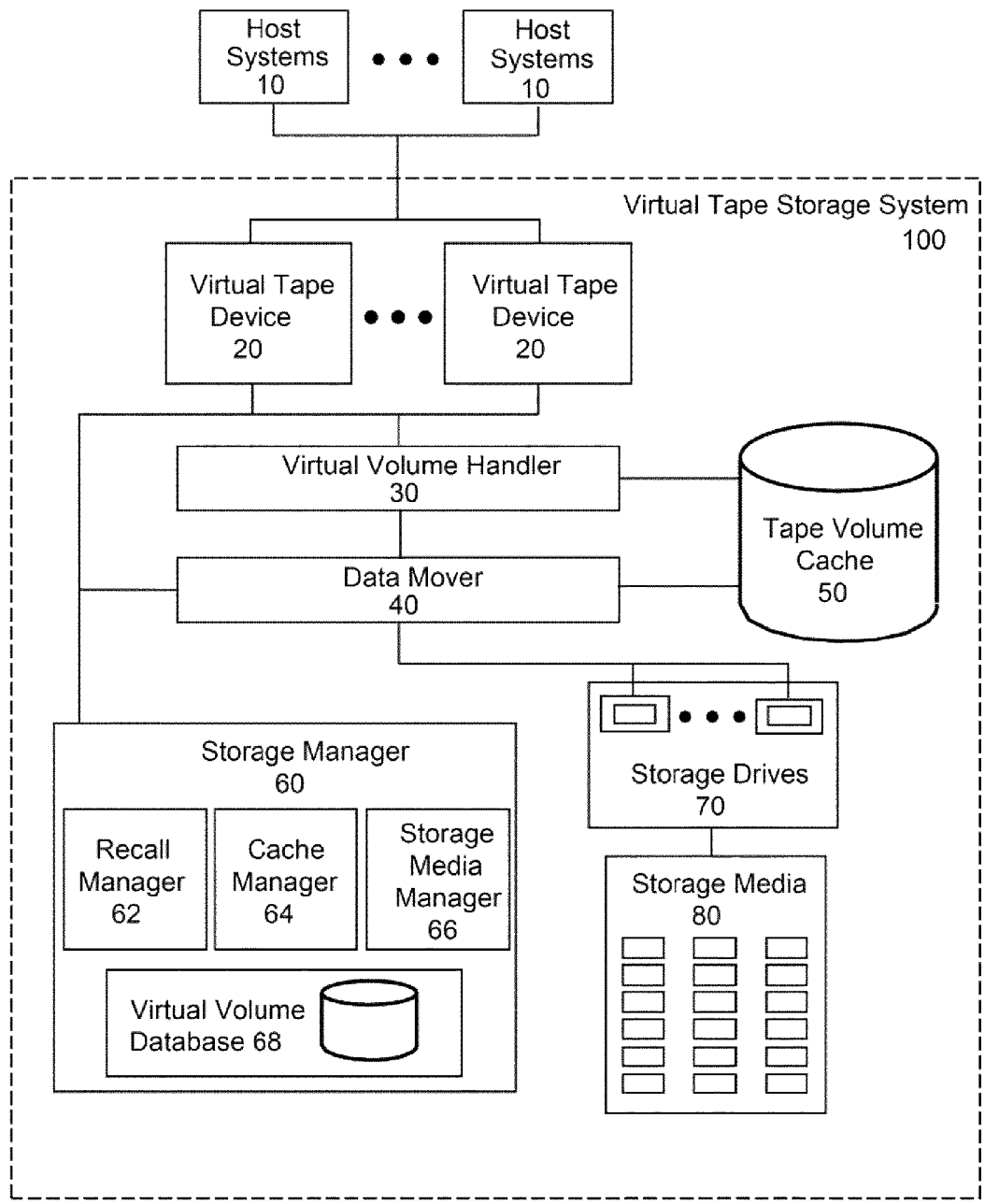
FIG. 1C is a block diagram showing an interconnection of functional components of a virtual tape storage system for partially recalling host-originated virtual volumes from physical tape storage to cache storage, in accordance with one embodiment.

Referring now to FIG. 1C, a block diagram of a virtual tape storage (VTS) system 100, for example an IBM TS7700 Virtual Tape Storage System, is shown coupled to a plurality of host systems 10. Application programs running within any host system 10 generate data to be stored within the VTS system 100. The host system 10 may be embodied by a variety of types and numbers of processing units, such as a mainframe computer, a personal computer, a server, a workstation, etc. The application programs may be of any number of types, including, but not limited to, hierarchical storage, data backup/recovery, master data file processing, etc.

Applications particularly well suited to utilize some embodiments of the methods and systems described herein are hierarchical storage applications, such as IBM Data Facility Storage Management System (DFSMS) Hierarchical Storage Manager (HSM), IBM Tivoli Storage Manager, etc. How these applications utilize tape storage is known in the art. The VTS system 100 includes a plurality of virtual tape devices 20 interconnected to the host system 10 and a virtual volume handler 30. The virtual volume handler 30 is coupled to the tape volume cache 50. A data mover 40 is also coupled to the tape volume cache 50 and a plurality of storage drives 70. Also, included in the VTS system 100 is a plurality of storage media 80. The storage media 80 may comprise a variety of types of sequential storage media, such as magnetic tape, optical disk, etc. The storage drives 70 may also include magnetic tape drives, optical drives, etc. Storage media 80 is moved to/from storage drives 70 by mechanical means (such as an automated tape system, not shown). The storage manager 60 is also coupled to the host system 10 through the virtual tape devices 20 as well as to all other elements of the VTS system 100. The storage manager 60 is comprised of at least one recall manager 62, at least one cache manager 64, at least one storage media manager 66 and at least one virtual volume database 68. The storage manager 60 may comprise a digital processing apparatus such as a microprocessor, personal computer, a more advanced processing machine, etc. The number of virtual volumes (e.g., volume 200 of FIG. 2) included in a VTS system 100 may number in the hundreds to the tens of thousands to many millions. Information about each of the virtual volumes 200 included in the VTS system 100 is kept in the virtual volume database 68 by the storage manager 60. The storage for the virtual volume database 68 is typically disk, but other non-volatile storage technologies, such as flash, RAM, etc., may be employed.

FIG. 2 is a representation of a virtual volume 200 used in a virtual tape storage (VTS) system (e.g., VTS system 100 of FIG. 1C) to store host system application data, according to one embodiment. A virtual volume 200 includes a volume header 210 and "J" host data records 220, in some approaches. Within a VTS system, there are a plurality of virtual volumes 200, each identified by a unique volume identifier, typically called a volume serial number (VOLSER). A plurality of virtual volumes 200 may be stored in the tape volume cache and managed by the storage manager, in some approaches.

FIG. 3 is a representation of a volume header 210, in one embodiment, that may be part of a virtual volume (e.g., volume 200 of FIG. 2). The volume header 210 may be made up of several elements and may be used by the storage manager and/or the virtual volume handler in managing a virtual volume, according to preferred embodiments. The elements may comprise a volume ID 212 which includes the unique volume identifier (VOLSER) for the virtual volume, a volume length 214 which includes a value that represents the overall number of bytes stored in the virtual volume, and a set of volume control flags 216. The volume control flags 216 may include many pieces of information useful in the management of a virtual volume, however, in accordance with some embodiments, only a single control flag, partial volume 218 is described.

With reference to FIGS. 1C, 2, and 4, FIG. 4 is a representation of a host data record 220 that may be part of a virtual volume 200, in one embodiment. A host data record 220 may be made up of several elements and may be used by the storage manager 60 and the virtual volume handler 30 in managing a virtual volume 200. A host data record 220 may have a variable length, dependent on the host written data record length and the amount of compression the virtual tape device 20 yields for the record. The elements may comprise a block ID 222 which includes a value that is incremented for every host written data block, a record length 224 which includes a value that represents the overall number of bytes of the last element, which may be compressed host data 224 which includes the post compressed data written by a host system 10.

FIG. 5 is a representation of a stacked storage media 80 physical tape volume that includes a label 82 and a plurality of logical volumes 84, according to one embodiment. The label 82 is typically a standard set of tape records that identifies the volume serial number (VOLSER) of the physical volume, its recording format, and other information, such as ownership. The label 82, in some embodiments, may be of a type well known in the art, such as an IBM Standard Tape Label or an ANSI Standard Volume Label. Referring to FIGS. 1C, 2, and 5, a logical volume 84 may be a copy of or derived from a virtual volume 200 from the tape volume cache 50 written by an independent drive and added to the VTS system 100, written directly from a host system 10 to a drive of the VTS system 100, etc. Logical volumes 84 may be placed end to end on the storage media 80 and are commonly referred to as being "stacked" on the media.

With reference to FIGS. 5 and 6, in FIG. 5 a representation of a logical volume 84 that has been copied to storage media 80 is shown according to one approach. A logical volume 84 includes a plurality of logical volume data records 310, each corresponding to a physical block on the storage media 80, the number depending on the amount of data stored on the virtual volume 200 the logical volume 84 is a copy of, in one embodiment. In this described embodiment, the length of the logical volume data record 310 may be fixed at 256 KB (262,144 bytes). Alternative embodiments are possible using different fixed logical volume data record 310 sizes, such as 128 KB, 512 KB, 1 MB, etc. Data from a virtual volume 200 may be segmented to fit into that record size as described later. The physical block that contains each logical volume data record 310 may be assigned a physical block ID (PBID) as it is written to the storage media 80, or at some other time as is convenient in the processing of the storage media (for example, several block IDs may be written in a single operation). The storage drive 70 may use the block ID in a subsequent search operation to quickly position the storage media 80 at a requested block ID. This search capability is well known as employed in many tape storage drives, such as the IBM 3592 High Performance Tape System, etc.

With reference to FIGS. 1C, 2, 5, and 7, in FIG. 7, a representation of a logical volume data record 310 is shown according to one embodiment. It includes two information fields and a data field. The first information field, virtual volume VOLSER 312, includes the volume serial number of the virtual volume 200. During a recall of a logical volume 84, the virtual volume VOLSER 312 field is used by the recall manager 62 to ensure that the correct virtual volume 200 is being copied back into the tape volume cache 50, in one approach. The second information field, virtual volume start block ID 314, includes the block ID 222 of the host data record 220 that starts at the beginning of the virtual volume data 316 field, in one embodiment. In accordance with one embodiment, the virtual volume start block ID 314 field may be used by the recall manager 62 to ensure that the correct host requested data records will be part of the data recalled into the tape volume cache 50. In this embodiment, the virtual volume VOLSER 312 field may be 6 bytes in length and the virtual volume start block ID 314 field may be 12 bytes in length. This leaves a total of 262,126 bytes for the virtual volume data field 316. Therefore, every logical volume data record 310 includes 262,126 bytes of the virtual volume 200 being copied to the storage media 84. For any virtual volume 200 with a length greater than 262,126 bytes, multiple logical volume data records 310 are used to store the virtual volume 200 on storage media 84, in a preferred embodiment.

Figures 8, 9:
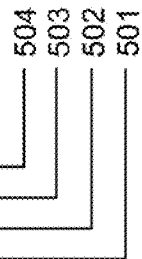
FIG. 8 is a generalized diagram of a host mount request used with a virtual tape storage system of FIG. 1C, according to one embodiment.
FIG. 9 is a generalized diagram that shows the contents of the virtual volume database of the virtual tape storage system of FIG. 1C, according to one embodiment.

With reference to FIGS. 1C, 2, and 8, in FIG. 8, a representation of a host mount request 400 that may be sent from the host system 10 to one of the virtual tape devices 20 in order to access a virtual volume 200 in a VTS system 100 is shown according to one embodiment. Included in the host mount request 400 is the VOLSER 410 field that may be used to pass the VOLSER of the virtual volume 200 that the host system 10 desires access to, or, in the alternative, if this field includes all blanks, the storage manager 60 may select any available free virtual volume 200 to satisfy the request, in one approach. Also included is a new flag field 420 that indicates that the host system 10 will write the virtual volume 200 from its beginning and any old data associated with the selected VOLSER can be discarded. The start block ID 430, block count 440 and block size 450 fields of the host mount request 400 may be used by the host system 10 when it requests that an existing virtual volume 200 is to be made accessible and is indicating that only the portion of the volume specified by the three fields is to be recalled into the tape volume cache 50, in one embodiment. Although only one group of these three fields is shown, it should be clear to those skilled in the art of building storage systems that multiple groups may be specified as part of the host mount request 400.

With reference to FIGS. 1C, 2, and 9, in FIG. 9, a representation of a few entries in the virtual volume database 68 for the virtual volumes 200 included in the VTS system 100 and managed by the storage manager 60 are shown according to one embodiment. Entries 501, 502, 503 and 504 are for virtual volumes 200 ABC123, EFG555, JKL777 and XYZ999, respectively. For each entry, the virtual volume database 68 includes a VOLSER 510 field that identifies the volume serial number of the virtual volume 200 associated with the entry, in one approach. Each entry also includes a cache residency 520 field that holds the status of the virtual volume 200 in regard to the tape volume cache 50, in another embodiment.

According to one approach, and not limiting in any way, the cache residency 520 field may include "Resident" if the virtual volume 200 is only included in the tape volume cache 50, it may include "Copied" if the virtual volume 200 is included in the tape volume cache 50 and is on a storage media 80, it may include "No" if the virtual volume 200 is only included on storage media 80, and it may include "Partial" if only a portion of virtual volume 200 is included in the tape volume cache 50.

Now referring to physical tape VOLSER 530, this field may include the volume serial number of the storage media 80 that a virtual volume 200 has been copied to. If the virtual volume 200 has not yet been copied to storage media 80, then this field may include "Null." Starting block 540 may include the block ID on storage media 80 that the first segment of logical volume 200 has been copied to. Blocks 550 may include the total number of blocks (and thus logical volume data records 310) on the storage media 80 used to copy the entire virtual volume 200. The last access/date time 560 field may include a date and time stamp of when the virtual volume 200 was last accessed by a host system 10. In accordance with one embodiment, a compression ratio 570 field may be included that has the ratio of the host system written bytes to the number of bytes stored in a virtual volume 200. For example, a compression ratio 570 value of 2.03, as shown for virtual volume 200 ABC123, indicates that the host system wrote 2.03 times the number of bytes needed to store the volume's data in the tape volume cache 50 due to the compression provided by the virtual tape device 20.

With reference to FIGS. 1C, 2, and 10, in FIG. 10, a representation of a few entries in the virtual volume database 68 for the virtual volumes 200 included in the VTS system 100 and managed by the storage manager 60 continues, in accordance with one embodiment. For each entry, the virtual volume database 68 includes a host dataset name 580 field that identifies at least a portion of the dataset name that the application has assigned to the data being written to a virtual volume 200. The contents for the host dataset name 580 field may be provided to the VTS system 100 by the application or the VTS system 100 may determine the contents, in some embodiments. According to one approach, and not limited in any way, the host dataset name 580 field may be 17 bytes in length, but any length may be used as would be known to one of skill in the art.

Now, referring back to FIGS. 1C-3 and 8, the virtual tape devices 20 within the VTS system 100 appear to the host system 10 as multiple storage devices, such as 256 IBM 3490 tape storage devices, each with a unique address, in one approach The hierarchical storage application running on a host system 10 creates a new virtual volume 200 by first having the host system 10 send a host mount request 400 to request that a virtual volume 200 be mounted on one of the virtual tape devices 20. The host mount request 400 indicates that the mount request is for a new volume by setting the new flag 420 to "Yes" and may include either a specific volume serial number in the VOLSER 410 field or all blanks in the VOLSER 410 field to indicate that the next available free virtual volume 200 is to be selected. Since this is a mount request for a new volume, the fields: start block ID 430, block count 440 and block size 450 may not be used and may include blanks or zeroes. The mount request is passed through the virtual tape device 20 to the storage manager 60, in one approach. The storage manager 60 then instructs the virtual volume handler 30 to create the virtual volume 200 in the tape volume cache 50. The virtual volume handler 30 writes a volume header 210 which includes the volume ID 212, a volume length 214 of zero, since this is a new volume, and in accordance with the present embodiment, the partial volume flag 218 may be set to "OFF." The storage manager 60 may also create/update its virtual volume database 68 with information about the virtual volume 200 being mounted, updating it cache resident type 520 to "Resident" indicating that it is only in the tape volume cache 50. Once the virtual volume 200 has been created in the tape volume cache 50, the virtual tape device 20 the mount request was received on indicates to the host system 10 that the mount is complete and that the application can begin to write data to that virtual tape device 20, in one embodiment.

In one embodiment, the host system 10 may write an IBM Standard label at the beginning of the virtual volume 200. One of the IBM Standard Label records, called header record 1 (HDR1), contains a 17 byte field that identifies the dataset being written. As the HDR1 record is being written, the virtual volume handler 30 may pass the dataset identifier to the storage manager 60 to be retained in the virtual volume database 68, in some approaches. In other approaches, the dataset identifier may be placed in the virtual volume database 68 at a later time.

In some embodiments, the hierarchical storage application running on a host system 10 now may migrate one or more host data files to the VTS system 100 by writing data to the virtual tape device 20. As each host data block is written, the data block, typically 16 KB (but not limited to 16 KB, for example, 8 KB, 32 KB, 64 KB, etc.), is compressed by the virtual tape device 20 and passed to the virtual volume handler 30. The virtual volume handler 30 may build a host data record 220 (FIG. 4) which includes the incrementing block ID 222, record length 224, and the compressed host record 226, in one approach. The host data record 220 may then be appended to the virtual volume 200 associated with the virtual tape device 20 the application is using. The hierarchical storage application will continue to write data blocks until either the virtual volume 200 has reached its capacity or there are no more host data files to migrate. In either case, the host system 10 will instruct the VTS system 100 to demount the virtual volume 200 through the virtual tape device 20. As each host data block is written, the virtual volume handler 30 may determine the compression achieved for each block and keep a running total for the virtual volume 200, in one approach. In addition, the virtual volume handler 30 may keep track of the host data record's 220 block ID 222 that will be in each Nth (e.g., tenth, twentieth, hundredth, etc.) physical data block and may update the virtual volume database 68 with this host record block ID 222.

According to some approaches, the demount request may be passed through the virtual tape device 20 to the storage manager 60. The storage manager 60 may instruct the virtual volume handler 30 to close the virtual volume 200 in the tape volume cache 50. It may also update its virtual volume database 68 to update the compression ratio field 570 using the information kept by the virtual volume handler 30, in one approach. It may also update the last access/data time field 560 in the virtual volume database 68. As part of closing the virtual volume 200 in the tape volume cache 50, the virtual volume handler 30 may update the volume header 210 to include some information, such as the overall length of the volume in volume length 214, in one embodiment.

Building a Pseudo Virtual Volume from a Partial Recall of a Logical Volume

In physical tape drives, one of the key functions is the ability to do a high speed locate operation to the beginning of the data to be read. This allows the tape drive to position to the requested data much faster than by just using conventional forward space block and read commands. This functionality also aids in performing recall operations.

Previous VTS systems that employ hierarchical storage are inefficient in handling recall operations since they recall an entire logical volume from the physical tape into cache before allowing the application that requested the recall to access the logical volume's data and the serialization of the operation. This is due, at least in part, to the VTS system not knowing which portion of a logical volume is requested by the application. The use of larger logical volumes, e.g., 4 GB and greater, further increases this inefficiency, as the time required to move the data from the tape to cache increases substantially with larger logical volume sizes.

This leads to an inefficiency in that the amount of data that is copied from physical tape back into cache is generally far greater than the amount of data actually requested to be read by the host application. One other aspect of previous VTS systems that is problematic is that the tape volumes that the applications are aware of are a logical construct and there is not a one-to-one relationship between the tape volumes and a physical tape to which they are copied. Many logical volumes are 'stacked' end-to-end on a physical tape volume to maximize the utilization of the physical media. This means that the positioning information that an application maintains for the location of a given dataset has no direct relationship to the location of the data on the underlying physical tape media. Also, the host written tape records are optionally compressed causing further variation in actual data locations on the physical tape. During a recall operation, if the tape drive over shoots the desired volume when fast forwarding to an approximated volume location on the tape, the drive must "backhitch" by stopping the tape, rewinding the tape, and then reversing again to read the tape at a point that the drive assumes is prior to the start of the desired volume. Of course, if this position on the tape is not prior to the desired volume, the process must be repeated. Meanwhile, the user that requested the data must wait for these actions to transpire before any data can be viewed, accessed, etc.

The foregoing problems may be solved with an advance in the art, which is described herein in various embodiments, including a system for partial recall of a virtual volume. The system, in one embodiment, includes a VTS system (such as VTS system 100 in FIG. 1C) supporting at least one virtual volume that is accessed through at least one virtual tape device. The VTS system also supports at least two levels of hierarchical storage, at least one level being random access storage, such as a disk-based storage system, and one level being sequential access storage, such as a physical tape drive and media. The storage capacity of each may be such that the physical tape storage is many times the capacity of the random access storage. The VTS system preferably employs data compression to reduce the amount of space required to store the data contained in a virtual and/or physical tape volume, in preferred embodiments. Data records of a fixed size written by the host system may be compressed resulting in smaller host data records stored on a virtual volume. The size of each resulting smaller host data record is dependent on the compressibility of the data of each host data record. The VTS system also places a plurality of virtual volumes on physical tape media and may copy virtual volume data between random access storage and physical tape. Pluralities of compressed host data records for a virtual volume may be combined to create larger fixed size data blocks written to physical tape media. The random access storage serves as a cache for virtual volumes and is referred to as a "tape volume cache." All host system access to the data contained in a virtual volume is through the tape volume cache, in preferred approaches. Additionally, the processor may maintain data attributes bound to the virtual volume to be used in the location and management of the virtual volume's data.

In one embodiment, the VTS system comprises a processor configured to allow a host system to access a subset of the data associated with a virtual volume, with the proviso that all of the virtual volume's data is not copied into the tape volume cache from its location on physical media, in one embodiment. The host system may provide information to the processor, such that the processor may retrieve only the portion of the virtual volume requested from physical media and configures the retrieved data in its tape volume cache such that the essential structure of a virtual volume remains so that, to the host system and its application programs, it appears that the system is accessing the original virtual volume, and not just a subset of the data in a partial virtual volume.

In another embodiment, the information the host system provides the processor regarding the portion of a virtual volume for which access is desired is the starting logical block identifier (SLBID) relative to the beginning of the virtual volume, the number of host data records to be accessed, and the size of the uncompressed host data records, in some embodiments. The processor uses the starting host data record number, the uncompressed size of the host data records, and information the processor retained to then determine the block identifier of the physical block written to physical media that contains the starting host data record. The processor also uses the number of host data records information to determine at least the minimum number of physical media data blocks to retrieve to ensure all of the host system requested data is available in the tape volume cache, in one approach.

In some embodiments, a mount command issued to the VTS system may be modified to provide additional information about the requested data. In addition to the logical volume the data resides on, the application may provide the logical block location of the beginning of the dataset/object that is requested, the number of data records that make up that dataset/object, and/or the uncompressed size of the data records. Since the data written to physical tape is in a packed structure, in some approaches, meaning that multiple host records are aggregated into a single 256 KB record that is written to the physical media, a method with which the physical block identification number (PBID) of the physical block can be found that contains the beginning of the requested dataset/object from the application would speed the data recall. To satisfy this need, in one embodiment, the application requesting the data may provide a logical block ID for the requested first host data record 220, and the VTS system may use information from its database or other structure to determine the physical block ID (PBID) on the physical media that contains the logical volume the requested data resides on.

In one approach, in addition to the existing specification of a VOLSER and optional storage constructs, a set of control flags, a logical host data record position (relative to the beginning of a virtual volume 200), and block count parameters are added to the mount request. The control flags, logical host data record position, and block count parameters are not just singular, but in some embodiments, they are designed such that multiple datasets from the same VOLSER may be efficiently requested. The purpose of the control flags is to indicate (1) whether subsequent parameters are to be used, and (2) the size of the requested host written data records and whether the needed dataset spans more than one VOLSER or whether additional host data records may be brought into the tape volume cache.

In processing a mount request, the VTS system may use the control flags to determine if an entire specified VOLSER is to be copied or if only a portion of the specified VOLSER is to be copied. If only a portion of the specified VOLSER is to be copied, the specified positioning information may be used to determine the physical block that includes the requested host data records within the logical volume the requested host data records are located in.

The sequential access storage media the logical volume resides on may then be mounted and when the mount is complete, a locate command may be issued to position the sequential access storage media to the proper physical block which includes the requested host data records. One or more host data records may be read (the number may be based on the amount of data indicated in the control flags). The VTS system may create a partial virtual volume in its tape volume cache and copy the read host data records to this partial virtual volume. Using information from a database accessible to the VTS system, such as the host dataset name 580, the VTS system may create the proper standard header labels (VOL1, HDR1, etc.). For the logical blocks of the partial virtual volume from the label area to the first host requested record, zero length records may be created. These zero length records have a valid header like any other data record, but have no data associated with them. Next, the requested data records are included, followed by more zero length data records, and concluded with the proper standard trailer labels. In essence, the VTS system creates a valid logical volume, but the volume only includes the requested host data records and proper formatting information.

In another embodiment, other than proper standard label records, the partial virtual volume may include only the requested host data records, meaning that there are no zero length data records included.

In one approach, the VTS system 100 may also update its virtual volume database 68 for the mounted VOLSER to indicate a cache resident type 520 of 'Partial.'

Once the partial virtual volume has been created, the host is informed that the mount request has completed. The host validates that the correct volume is mounted, using the volume header labels, then issues a locate command to position to the proper dataset in order to read the requested host data records.

If the mount command indicates that multiple datasets were to be brought in, the host continues to issue locate commands in order to read that additional data. Once it has completed all of the reads, the host demounts the volume and the VTS system removes the partial virtual volume from the tape volume cache.

In one embodiment, if the application issues a locate command that points to a host data record that is not part of the host data records requested by the mount, the VTS system 100 may then perform a complete recall of the logical volume.

According to some approaches, two advantages are apparent over the current state of the art. First, the time it takes to provide host access to the requested host data records is significantly shorter than in the prior art. For example, assume that requested data is located in a middle portion of a 4 GB volume using IBM JA physical media and a TS1130 drive. Also, assume that the data rate that data can be copied from the physical drive to the cache is about 20 MB/sec (this is typical in a VTS system where multiple drives are reading and writing data). With current techniques and methods, the spent time for each operation is presented below in Table 1.

TABLE 1

| Operation | Time Spent |
|---|---|
| Host mount request processing | 2 seconds |
| Robotic movement of the physical tape cartridge to the tape drive | 5 seconds |
| Loading/threading of the drive | 12 seconds |
| Physical locate to the beginning of the logical volume (assuming traversing 280 meters at 10 m/sec) | 28 seconds |
| Read in 4 GB of data into the cache from logical volume (assuming 20 MB/sec read rate) | 200 seconds |
| Notifying the host that the mount is ready, host validating label | 5 seconds |
| Issuing locate and reading 64 KB of data | <1 second |
| Total: | 253 seconds |

Now, according to one embodiment, and as an example only, using methods described herein, a VTS system may perform the data recall in times as reflected in Table 2.

TABLE 2

| Operation | Time Spent |
|---|---|
| Host mount request processing and calculation of physical location | 3 seconds |
| Robotic movement of the physical tape cartridge to the tape drive | 5 seconds |
| Loading/threading of the drive | 12 seconds |
| Physical locate to the beginning of the dataset on the logical volume (assuming traversing 420 meters at 10 m/sec, 280 meters to beginning of the logical volume and 120 meters to the requested data record) | 40 seconds |
| Read in 256 KB data block into the tape volume cache (assuming 20 MB/sec read rate) | <1 second |
| Notifying the host that the mount is ready, host validating label | 5 seconds |
| Issuing locate and reading 64 KB of data | <1 second |
| Total: | 68 seconds |

According to one embodiment, using the methods and/or systems described herein may result in a reduction of 185 seconds (73%), assuming the parameters are similar to what was described above. Of course, the time savings may be more or less depending on the location of the requested dataset within the logical volume, the size of the physical blocks, etc. The reduction in time spent is primarily a result of not having to read the unneeded data contained in the logical volume into the tape volume cache.

Another advantage of using the methods and/or systems described herein is that the space in the tape volume cache may be minimized as compared to the prior art because only the requested data is read into the tape volume cache, instead of the entire logical volume. This means that older volumes in the tape volume cache do not have to be removed and may have a longer residency, which may improve the overall tape volume cache hit ratio. Using the same assumed information as above (i.e., 4 GB volume, 64 KB required dataset size), recalling just 10 datasets using typically used existing methods would result in bringing 40 GBs of data back into the tape volume cache, of which only 640 KB would be utilized. With the methods and/or systems described herein, less than 1 MB of cache space would be used, resulting in a ratio of 40,000 to 1.

Yet another advantage of using the methods and/or systems described herein is the minimal impact to existing application programs because the VTS system 100 creates a virtual volume from the partially recalled data that looks like a full virtual volume to any application accessing it.

Referring again to FIG. 1C, in one embodiment, a virtual tape storage (VTS) system 100 comprises a tape volume cache (such as tape volume cache 50), at least one storage drive (such as storage drives 70) for interacting with sequential access storage media (such as storage media 80), logic for receiving a mount request to access at least one host data record stored on a sequential access storage medium (such as that used by virtual tape device 20), the mount request including a virtual volume identifier of a logical volume stored on the sequential access storage medium having the requested at least one host data record therein, logic for issuing a locate command (such as that used by data mover 40) to position the sequential access storage medium to about a physical block in the logical volume having at least a portion of the requested at least one host data record therein based on the virtual volume identifier, logic for creating and supporting a partial virtual volume (such as that used by virtual volume handler 30) in the tape volume cache, and logic for copying at least the physical block having the requested at least one host data record residing therein to the partial virtual volume. Of course, all or some of the logic described above may be executed by a single processor, multiple processors, hardware, etc. Also, a storage manager (such as storage manager 60 may be used to enable some or all of the logic functions described herein).

In one embodiment, the VTS system may also include logic for extracting information from the mount request. The information may include a logical block location of a beginning of the requested at least one host data record and a number of host data records that comprise the requested at least one host data record. This information may then be used to determine a position where a physical block comprising the requested at least one host data record begins and an amount of data to copy based on the logical block location of the beginning of the requested at least one host data record and the number of host data records that comprise the requested at least one host data record. For example, the logical block location of the beginning of the requested at least one host data record and the number of data records that comprise the requested data may be used to determine how much data to copy, and where to start copying from the logical volume.

In some approaches, the VTS system may include logic for extracting information from the mount request, and logic for determining a position where a physical block comprising the requested at least one host data record begins and an amount of data to copy based on the logical block location of the beginning of the requested at least one host data record and the uncompressed size of the requested at least one host data record. The information may include a logical block location of a beginning of the requested at least one host data record and an uncompressed size of the requested at least one host data record.

In more approaches, the VTS system may include logic for extracting information from the mount request. The information may include a logical block ID (LBID). The LBID may correspond to a physical block residing on the sequential access storage medium, and the LBID may be used to locate a physical block residing on the sequential access storage medium having the requested at least one host data record therein.

In one embodiment, the mount request may include a set of control flags, a logical host data record position, and block count parameters. The set of control flags may indicate whether subsequent parameters are to be used, a size of host data records written to the virtual volume, whether the requested at least one host data record spans more than one virtual volume, and whether additional data is to be copied to the tape volume cache. In more approaches, the VTS system may include logic for using the control flags to determine if all of a logical volume is to be copied or if only a portion of the logical volume is to be copied into the tape volume cache.

In another approach, the VTS system may include logic for determining a physical block within the logical volume that includes the requested at least one host data record. This physical block may be determined based on information obtained by the VTS system.

In one approach, the VTS system may include logic for using information from a database to create a header label for the partial virtual volume.

In one embodiment, the partial virtual volume may comprise a label area positioned before at least one data logical block, and at least one trailer label area following the at least one data logical block. In some further embodiments, the partial virtual volume may include at least one first logical block positioned after the label area and before the at least one data logical block, and at least one second logical block positioned after the at least one data logical block and before the trailer label area, wherein the at least one first logical block and the at least one second logical block comprise a zero length and a header. In more embodiments, the at least one data logical block may comprise the requested at least one host data record. In addition, the partial virtual volume may appear just like a whole virtual volume to the host system, application, etc.

Figure 11:
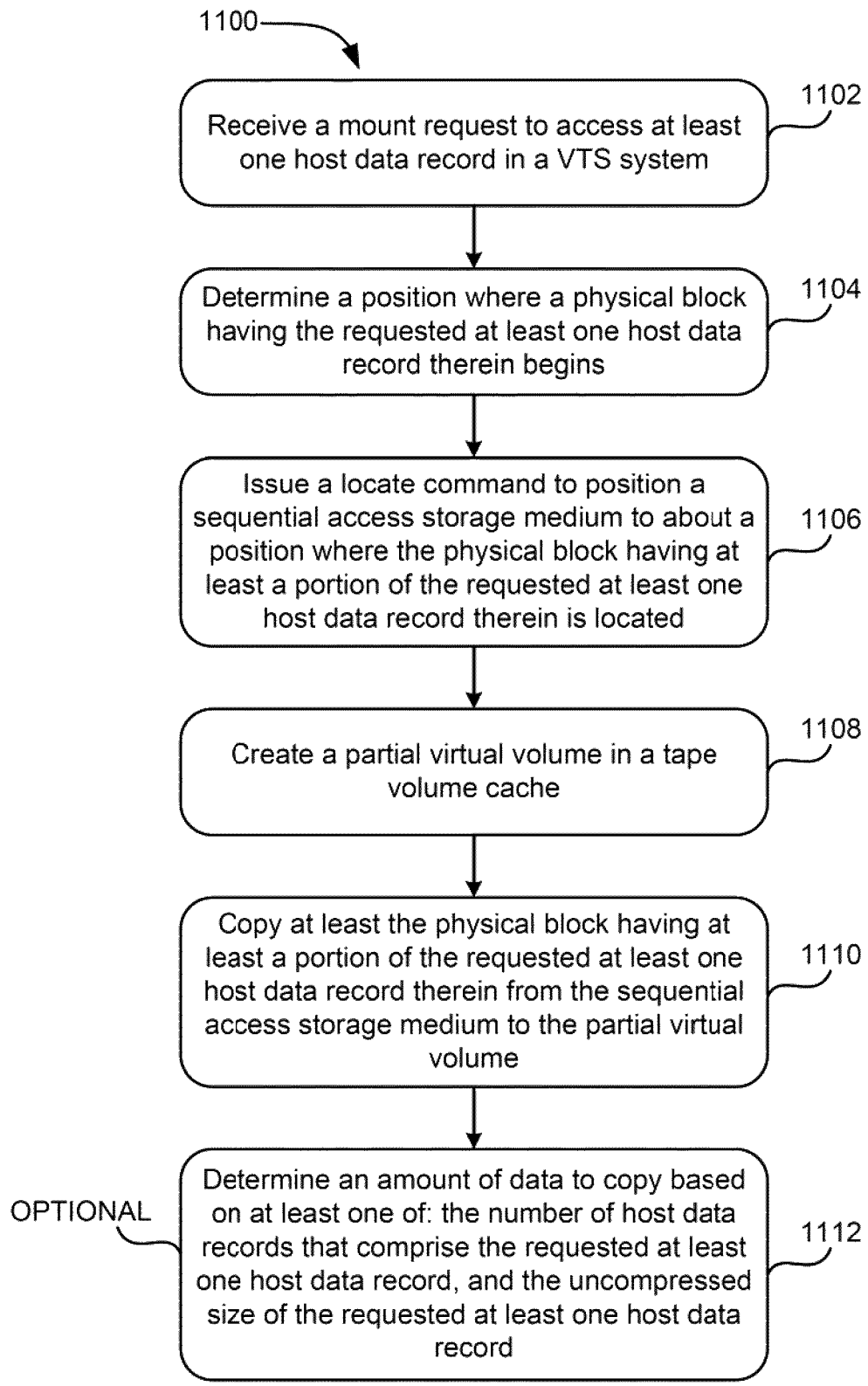
FIG. 11 is a flow diagram of a method, according to one embodiment.

Now referring to FIG. 11, a method 1100 for accessing data stored in a virtual tape storage (VTS) system is shown according to one embodiment. The method 1100 may be carried out in any desired environment, including those described herein, and may include embodiments and/or approaches described herein. Also, the method 1100 may include more operations than those described below, as would be known to one of skill in the art.

In operation 1102, a mount request is received to access at least one host data record in a virtual tape storage (VTS) system. The mount request includes: a virtual volume identifier of a virtual volume having the requested at least one host data record therein, a logical block location of a beginning of the requested at least one host data record in the virtual volume, a number of host data records that comprise the requested at least one host data record and an uncompressed size of the requested at least one host data record. In some approaches, the logical block location of a beginning of the requested at least one host data record in the virtual volume may be used to locate a position in the logical volume where the beginning of the physical block having the requested at least one host data record therein is located.

In one approach, the virtual volume identifier may be a volume serial number (VOLSER).

In some approaches, the mount request may include a set of control flags, a logical host data record position, and block count parameters, as previously described. The set of control flags may indicate any desired property or parameter, for example, the control flags may indicate whether subsequent parameters are to be used, a size of host data records written to the virtual volume, whether the requested at least one host data record spans more than one virtual volume, whether additional data is to be copied to the tape volume cache, etc. in some approaches, the control flags may be used to determine if all of a logical volume is to be copied or if only a portion of the logical volume is to be copied into the tape volume cache.

In operation 1104, a position where a physical block having the requested at least one host data record therein begins is determined. This position may be determined based on information provided in the mount request. For example, a logical block ID (LBID) may be extracted from the mount request, the LBID corresponding to a physical block residing on the sequential access storage medium. In these embodiments, the LBID may be used to locate a physical block residing on the sequential access storage medium having the requested at least one host data record, therein.

In operation 1106, a locate command is issued to position a sequential access storage medium to about a position where the physical block having at least a portion of the requested at least one host data record therein is located. By "about" the position, what is meant is a location near the position where the physical block is located, preferably in a position located enough prior to the physical block that a storage drive may begin reading data from the sequential access storage medium before the physical block is read.

In operation 1108, a partial virtual volume is created in a tape volume cache. The tape volume cache may be comprised of random access storage media, such as hard disks, flash memory, etc.

According to one preferred embodiment, the partial virtual volume may comprise a label area positioned before at least one data logical block, and at least one trailer label area following the at least one data logical block. In a further approach, the partial virtual volume may include at least one first logical block positioned after the label area and before the at least one data logical block, and at least one second logical block positioned after the at least one data logical block and before the trailer label area, wherein the at least one first logical block and the at least one second logical block comprise a zero length and a header. Furthermore, the at least one data logical block may comprise the requested at least one host data record, in one approach.

In some approaches, information from a database may be used to create a header label for the partial virtual volume. The database may be stored to the VTS system or may be accessible to the VTS system.

In operation 1110, at least the physical block having at least a portion of the requested at least one host data record therein is copied from the sequential access storage medium to the partial virtual volume.

In some approaches, this may be referred to as partial volume recall, since the entire volume is not copied to the tape volume cache.

In optional operation 1112, an amount of data to copy may be determined based on at least one of: the number of host data records that comprise the requested at least one host data record, and the uncompressed size of the requested at least one host data record.

According to another embodiment, a computer program product for accessing data stored on a virtual tape storage (VTS) system includes a computer readable storage medium having computer readable program code embodied therewith. The computer readable program code comprises computer readable program code configured to receive a mount request to access at least one host data record in a VTS system, wherein the mount request includes: a virtual volume identifier of a virtual volume having the requested data therein, the virtual volume being stored on a sequential access storage medium as a logical volume; a logical block location of a beginning of the requested at least one host data record in the virtual volume; a number of host data records that comprise the requested at least one host data record; and an uncompressed size of the requested at least one host data record. The computer readable program code also includes computer readable program code configured to determine a position where a physical block having at least a portion of the requested at least one host data record therein begins, computer readable program code configured to issue a locate command to position the sequential access storage medium to about the position where the physical block having at least a portion of the requested at least one host data record therein is located based on the virtual volume identifier, computer readable program code configured to determine an amount of data to copy based on at least one of: the number of host data records that comprise the requested at least one host data record, and the uncompressed size of the requested at least one host data record, computer readable program code configured to create a partial virtual volume in a tape volume cache, and computer readable program code configured to copy at least the physical block having at least a portion of the requested at least one host data record therein from the sequential access storage medium to the partial virtual volume.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A virtual tape storage (VTS) system, comprising:
a tape volume cache;
at least one storage drive for interacting with sequential access storage media;
logic configured to receive a mount request to access at least one host data record stored on a sequential access storage medium, the mount request including a virtual volume identifier of a logical volume stored on the sequential access storage medium having the requested at least one host data record therein, wherein the mount request includes a logical host data record position and block count parameters;
logic configured to issue a locate command to position the sequential access storage medium to about a physical block in the logical volume having at least a portion of the requested at least one host data record therein based on the virtual volume identifier;
logic configured to create and support a partial virtual volume in the tape volume cache in response to receiving the mount request;
logic configured to extract information from the mount request, the information comprising a logical block location of a beginning of the requested at least one host data record and a number of host data records that comprise the requested at least one host data record;
logic configured to determine a position on the sequential access storage medium where a physical block comprising the requested at east one host data record begins and an amount of data to copy based on the logical block location of the beginning of the requested at least one host data record and the number of host data records that comprise the requested at least one host data record,
wherein the determined amount of data to copy is less than the amount of data in the logical volume, and
logic configured to copy at least the physical block having at least a portion of the requested at least one host data record residing therein to the partial virtual volume.

2. The VTS system as recited in claim 1, further comprising:
logic configured to extract information from the mount request, the mount request being received front a host, the information comprising, a logical block location of a beginning of the requested at least one host data record and an uncompressed size of the requested at least one host data record; and
logic configured to determine a position on the sequential access storage medium where a physical block comprising the requested at least one host data record begins and an amount of data to copy based on the logical block location of the beginning of the requested at least one host data record and the uncompressed size of the requested at least one host data record.

3. The VTS system as recited in claim 1, further comprising logic configured to extract a logical block ID (LBID) from the mount request, the LBID corresponding to a physical block residing on the sequential access storage medium, wherein the LBID is used to locate a physical block residing on the sequential access storage medium having the requested at least one host data record therein.

4. The VTS system as recited in claim 1, wherein the mount request includes a set of control flags.

5. The VTS system as recited in claim 4, wherein the set of control flags indicates whether subsequent parameters are to be used and at least one of: a size of host data records written to the virtual volume, whether the requested at least one host data record spans more than one virtual volume, and whether additional data is to be copied to the tape volume cache.

6. The VTS system as recited in claim 4, further comprising logic configured to use the control flags to determine if all of a logical volume is to be copied or if only a portion of the logical volume is to be copied into the tape volume cache.

7. The VTS system as recited in claim 6, further comprising logic configured to determine a physical block within the logical volume that includes the requested at least one host data record.

8. The VTS system as recited in claim 1, further comprising logic configured to use information from a database to create a header label for the partial virtual volume.

9. The VTS system as recited in claim 1, wherein the partial virtual volume comprises:
   a label area positioned before at least one data logical block; and
   at least one trailer label area following the at least one data logical block.

10. The VTS system as recited in claim 9, further comprising:
    at least one first logical block positioned after the label area and before the at least one data logical block; and
    at least one second logical block positioned after the at least one data logical block and before the trailer label area,
    wherein the at least one first logical block and the at least one second logical block comprise a zero length and a header.

11. The VTS system as recited in claim 9, wherein the at least one data logical block comprises the requested at least one host data record.

12. A method for accessing data stored in a virtual tape storage (WS) system, the method comprising:
    receiving a mount request to access at least one host data record a VTS system, wherein the mount request includes:
      a virtual volume identifier of a virtual volume having the request least one host data record therein,
      a logical block location of a beginning of the requested at least one host data record in the virtual volume;
      a number of host data records that comprise the requested at least one host data record; and
      an uncompressed size of the requested at least one host data record;
    determining a position on a sequential access storage medium where a physical block having at least a portion of the requested at least one host data record therein begins, the at least one host data record being within a logical volume on the sequential access storage medium;
    issuing a locate command to position the sequential access storage medium having the logical volume stored therein to about a position where the physical block having at least a portion of the requested at least one host data record therein is located based on the virtual volume identifier;
    creating a partial virtual volume in a tape volume cache; and
    copying the physical block having the at least a portion of the requested at least one host data record therein from the sequential access storage medium to the partial virtual volume in the tape volume cache,
    wherein an amount of data copied from the logical volume on the sequential access medium to the partial virtual volume is less than the amount of data in the logical volume on the sequential access medium.

13. The method as recited in claim 12, wherein the at least one host data record is compressed, and further comprising determining an amount of data to copy based on at least one of: the number of host data records that compromise the requested at least one host data record, and the uncompressed size of the requested at least one host data record.

14. The method as recited in claim 12, further comprising extracting a logical block ID (LBID) from the mount request, the LBID corresponding to a physical block residing on the sequential access storage medium, wherein the LBID is used to locate a physical block residing on the sequential access storage medium having the requested at least one host data record therein.

15. The method as recited in claim 12, wherein the mount request includes a set of control flags, a logical host data record position, and block count parameters.

16. The method as recited in claim 15, wherein the set of control flags indicates whether subsequent parameters are to be used and at least one of: a size of host data records written to the virtual volume, whether the requested at least one host data record spans more than one virtual volume, and whether additional data is to be copied to the tape volume cache.

17. The method as recited in claim 15, further comprising using the control flags to determine if all of a logical volume is to be copied or if only a portion of the logical volume is to be copied into the tape volume cache.

18. The method as recited in claim 12, wherein a logical volume identifier of a logical volume having the requested host data record is a volume serial number (VOLSER).

19. The method as recited in claim 12, wherein the partial virtual volume is created in response to receiving the mount request.

20. The method as recited in claim 12, wherein the partial virtual volume comprises:
    a label area positioned before at least one data logical block; and
    at least one trailer label area following the at least one data logical block.

21. The method as recited in claim 20, further comprising:
    at least one first logical block positioned after the label area and before the at least one data logical block; and
    at least one second logical block positioned after the at least one data logical block and before the trailer label area,
    wherein the at least one first logical block and the at least one second logical block comprise a zero length and a header.

22. The method as recited in claim 12, wherein the mount request is received from a host.

23. A computer program product for accessing data stored on a virtual tape storage (VTS) system, the computer program product comprising:
    a non-transitory computer readable storage medium having computer readable program code embodied therewith, the computer readable program code comprising:
    computer readable program code configured to receive a mount request to access at least one host data record in a VTS system, the mount request being received from a host, wherein the mount request includes:
      a virtual volume identifier of a virtual volume having the requested data therein, the virtual volume being stored on a sequential access storage medium as a logical volume;

a logical block location of a beginning of the requested at least one host data record in the virtual volume;

a number of host data records that comprise the requested at least one host data record; and an uncompressed size of the requested at least one host data record;

computer readable program code configured to extract the to block location and the number of host data records from the mount request;

computer readable program code configured to determine a position on a sequential access storage medium where a physical block having at least a portion of the requested at least one host data record therein begins, the at least one host data cord being within a to volume on the sequential access storage medium;

computer readable program code configured to issue a locate command to position the sequential access storage medium to about the position on a sequential access storage medium where the physical block having at least a portion of the requested at least one host data record therein is located based on the virtual volume identifier;

computer readable program code configured to determine an amount of data to copy based on at least one of: the number of host data records that comprise the requested at least one host data record, and the uncompressed size of the requested at least one host data record, wherein the determined amount of data to copy is less than the amount of data in the logical volume;

computer readable program code configured to create a partial virtual volume in a tape volume cache in response to receiving the mount request; and computer readable program code configured to copy at least the physical block having at least a portion of the requested at least one host data record therein from the sequential access storage medium to the partial virtual volume.

24. The computer program product as recited in claim 23, wherein the mount request includes a set of control flags, wherein the set of control flags indicates whether subsequent parameters are to be used and at least one of: a size of host data records written to the virtual volume, whether the requested at least one host data record spans more than one virtual volume, and whether additional data is to be copied to the tape volume cache.

* * * * *